(12) United States Patent
Granström et al.

(10) Patent No.: US 9,471,663 B1
(45) Date of Patent: Oct. 18, 2016

(54) CLASSIFICATION OF MEDIA IN A MEDIA SHARING SYSTEM

(71) Applicant: Google Inc., Mountain View, CA (US)

(72) Inventors: Johan Georg Granström, Zurich (CH); Anosh Raj, San Francisco, CA (US)

(73) Assignee: Google Inc., Mountain View, CA (US)

( * ) Notice: Subject to any disclaimer, the term of this patent is extended or adjusted under 35 U.S.C. 154(b) by 353 days.

(21) Appl. No.: 14/160,723

(22) Filed: Jan. 22, 2014

(51) Int. Cl.
*G06F 7/00* (2006.01)
*G06F 17/00* (2006.01)
*G06F 17/30* (2006.01)
*G06F 15/16* (2006.01)

(52) U.S. Cl.
CPC ... *G06F 17/30598* (2013.01); *G06F 17/30038* (2013.01); *Y10S 707/913* (2013.01)

(58) Field of Classification Search
CPC .................. G06F 17/30038; G06F 17/30598; Y10S 707/913
USPC ........................................ 707/690, 737, 913
See application file for complete search history.

(56) References Cited

U.S. PATENT DOCUMENTS

| | | | |
|---|---|---|---|
| 8,195,038 B2 | 6/2012 | Liu et al. | |
| 8,229,219 B1 | 7/2012 | Ioffe | |
| 8,238,669 B2 | 8/2012 | Covell et al. | |
| 8,347,408 B2 | 1/2013 | Rodriguez et al. | |
| 8,611,422 B1 | 12/2013 | Yagnik et al. | |
| 8,838,609 B1 | 9/2014 | Sharifi et al. | |
| 8,947,595 B1 | 2/2015 | Tucker et al. | |
| 8,953,836 B1 | 2/2015 | Postelnicu et al. | |
| 8,965,863 B1* | 2/2015 | Kulkarni | G06F 17/30424 707/690 |
| 9,043,228 B1* | 5/2015 | Ross, Jr. | G06Q 30/06 705/27.1 |
| 9,113,203 B2 | 8/2015 | Pora et al. | |
| 9,275,427 B1 | 3/2016 | Sharifi | |
| 2009/0074235 A1 | 3/2009 | Lahr et al. | |
| 2009/0157472 A1* | 6/2009 | Burazin | G06Q 30/02 705/14.57 |
| 2011/0109769 A1* | 5/2011 | Bhatt | H04N 5/77 348/231.5 |
| 2012/0069131 A1* | 3/2012 | Abelow | G06Q 10/10 348/14.01 |
| 2012/0095958 A1 | 4/2012 | Pereira et al. | |
| 2014/0074783 A1* | 3/2014 | Alsina | G06Q 10/10 707/624 |
| 2014/0108946 A1* | 4/2014 | Olofsson | G06Q 50/01 715/739 |
| 2014/0129942 A1* | 5/2014 | Rathod | G06Q 50/01 715/720 |
| 2014/0344289 A1* | 11/2014 | Berenson | G06F 17/30038 707/751 |

OTHER PUBLICATIONS

U.S. Appl. No. 13/450,427, filed Apr. 18, 2012, entitled, "Full Digest of an Audio File for Identifying Duplicates," 24 pages.

(Continued)

*Primary Examiner* — Usmaan Saeed
*Assistant Examiner* — Brian E. Weinrich
(74) *Attorney, Agent, or Firm* — Fenwick & West LLP

(57) ABSTRACT

Systems and methods for classifying media items in a media system are provided. In particular, media items can be uploaded to a serve. Data describing the media items can be monitored. Alterations of data describing the media items or inconsistencies of the data describing can be detected. A corrective action can be determined based on the alterations and or the inconsistencies. The corrective action can manage media items in multiple classification systems.

17 Claims, 10 Drawing Sheets

(56) References Cited

OTHER PUBLICATIONS

U.S. Appl. No. 14/154,953, filed Jan. 14, 2014, entitled, "Real-Time Duplicate Detection of Videos in a Massive Video Sharing System," 28 pages.

U.S. Appl. No. 13/942,638, filed Jul. 15, 2013, entitled, "Determining a Likelihood and Degree of Derivation Among Media Content Items," 36 pages.

* cited by examiner

CLASSIFICATION OF MEDIA IN A MEDIA SHARING SYSTEM

TECHNICAL FIELD

This disclosure generally relates to classifying media content in a media sharing system and/or altering data describing media content in a media hosting system.

BACKGROUND

The proliferation of available media items is increasing at exponential levels that will soon reach many millions if not billions of such viewable media content. With the ubiquitous nature of media creation and publishing tools, individuals are able to become productive content creators. This has resulted in exceptional growth of available media items.

Media items can be classified according to composition, subject area, age groups, and the like. With the growth of available media items, it is inevitable that related media items or portions of media items are uploaded to websites. Conventionally, each media item is assigned its own descriptive data. Manual analysis of media content is highly inefficient considering the large body of available media content.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to classifying media items in a massive media item system. A detection component can detect change events associated with media items. The change events can represent a change in classification, cluster, or the like. In another aspect, the change event can represent an inconsistency of descriptive data. A policy component can determine a corrective action based on the change event. The corrective action can comprise altering descriptive data and/or generating a report describing the change event. A merging component can merge and/or alter descriptive data of media items based on the corrective action.

Other embodiments relate to methods for altering descriptive data and/or classifying media items in a massive media item system. For example, a server that distributes user-broadcasted media content. Inconsistencies and changes associated with descriptions of media items relating to a common cluster can be corrected based on alteration policies.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
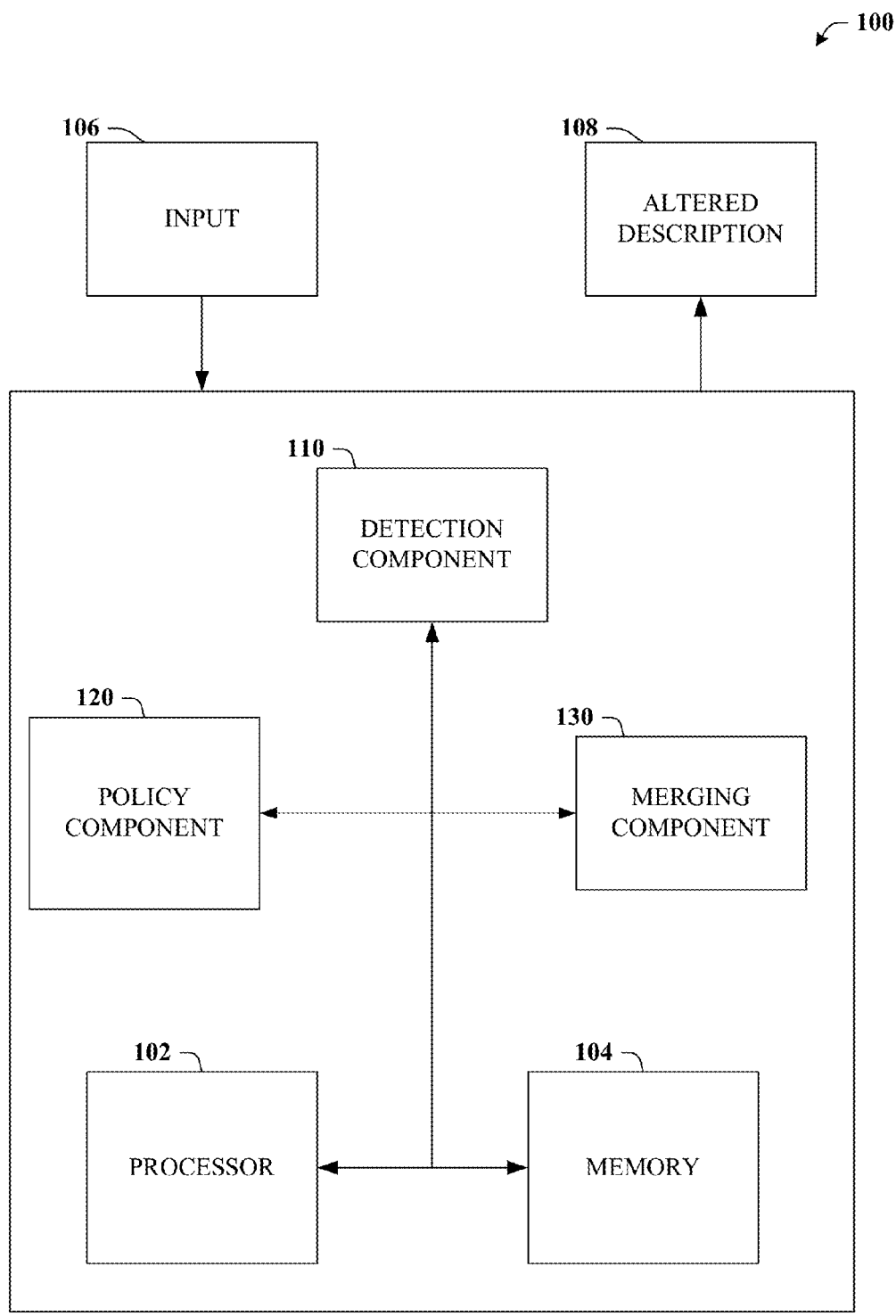
FIG. 1 illustrates a high-level block diagram of an example system that can alter descriptive data of media items and classify media items in accordance with certain embodiments of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing this disclosure.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server. Moreover, one or more implementations described herein can provide for anonymizing collected, received, or transmitted data.

In accordance with one or more implementations described in this disclosure, a system can classify media items and/or merge descriptive data associated with media items. Media items can comprise video, audio, text, and/or a combination of the above. A media item classification system can alter descriptors of identified media items, reduce cost of search results, control copying of media items, increase reliability of descriptive data, and provide for a more robust media sharing system. In a media item service, classification of media items can reduce cost and increase overall efficiency of a system.

A detection component detect changes of data describing a media item. The data describing the media item ("descriptive data") can include meta data, classification data, cluster data, data describing an aspect or feature of a media item, and the like. A change can occur based on user input, automated editing of descriptive data, uploading of a new media item, matching a media item to another media item, and the like. A cluster can represent a set of classifiers that describe a media item and/or set of media items. In an example, a user can alter a description of a media item to rate the media item as pertaining to a "mature" audience and the detection component can detect the alteration.

A policy component can, in response to the detection component detecting the change, determine a matching media item associated with the media item and/or determine a policy for altering descriptive data of matched media items and/or associated media items. For example, a policy component can determine that a first media item, associated with a change, is associated with a second media item. The data describing a first media item of a video clip can be altered and the first media item can be identified, by the policy component, as associated (e.g., a duplicate and/or partial duplicate, sharing common features, etc.) with a second media item that contains the video clip. In another aspect the policy component can determine an action based on the altered descriptive data.

A merging component can determine whether to alter, in response to the policy component determining the matching media item, the descriptive data of related media items. In an aspect, the merging component can alter the descriptive data based on an action determined according to a merging policy. For example, the merging component can determine to alter descriptive data of a first media item if descriptive data of a second related media is altered. In another example, the merging component can determine to not alter descriptive data of a first media item if exclusive descriptive data of a second related media item is altered. Various other aspects are described in more detail herein.

In implementations, the components described herein can perform actions, in real-time, near real-time, online and/or offline. Online/offline can refer to states identifying connectivity between one or more components. In general, "online" indicates a state of connectivity, while "offline" indicates a disconnected state. In an aspect, offline merging can prevent service interruptions, end-user quality degradation, and the like.

While the various components are illustrated as separate components, it is noted that the various components can be comprised of one or more other components. Further, it is noted that the embodiments can comprise additional components not shown for sake of brevity. Additionally, various aspects described herein may be performed by one device or two or more devices in communication with each other.

Referring now to FIG. 1, a system 100 is depicted. System 100 can classify media items and alter descriptive data of related media items. Embodiments disclosed herein, for example, can detect a change event, such as a change and/or inconsistency in descriptive data of media items in real-time and/or near real time and alter descriptive data of related media items, such as clusters, classifiers, meta-data, and the like. Such can enable additional features and improve user satisfaction, and can be particularly useful in massive media systems. System 100 can include a memory 104 that stores computer executable components and a processor 102 that executes computer executable components stored in the memory 104. It is to be appreciated that the system 100 can be used in connection with implementing one or more of the systems or components shown and described in connection with other figures disclosed herein. It is noted that all or some aspects of system 100 can be comprised in larger systems such as servers, computing devices, smart phones, and the like. As depicted, system 100 can include a detection component 110 (which can detect changes to descriptive data), a policy component 120 (which can detect related media items and determine corrective actions based on a policy), and a merging component 130 (which can alter descriptive data of media items).

System 100 can receive input 106 as a media item, input requesting a change to descriptive data of a media item, input instructing a change in descriptive data, input notifying of a change in descriptive data, and the like. The detection component 110 can determine if descriptive data has changed based on the input. For example, a user can alter a description of a video hosted on a video sharing site. In another example, a system can analyze a video and determine the video contains mature content (e.g., language, violence, etc.). If the descriptive data does not indicate the video is for a mature audience, the system can alter the descriptive data of the video and the detection component 110 can detect the alteration. In another example, a user can upload a media item and the detection component 110 can detect the cluster, classification, and/or other descriptive data. It is noted that a change in descriptive data can include a newly uploaded media item and/or newly added descriptive data.

In implementations, the detection component 110 can detect inconsistencies of descriptive data and/or clusters. Inconsistencies can include contradicting classifications, anomalies in descriptive data, and the like. In an aspect, the inconsistencies can be eliminated as the system 100 manages the classification data and clusters of various media items. In another aspect, system 100 can utilize a batch algorithm that processes inconsistencies and/or changes at a given time and/or interval. For example, as media items are uploaded and/or edited by users, system 100 can store the media items and edits. System 100 can process the uploaded media items and/or edits at a given time, such as when a website is experiencing the least amount of use and/or when a server is offline.

Figure 2:
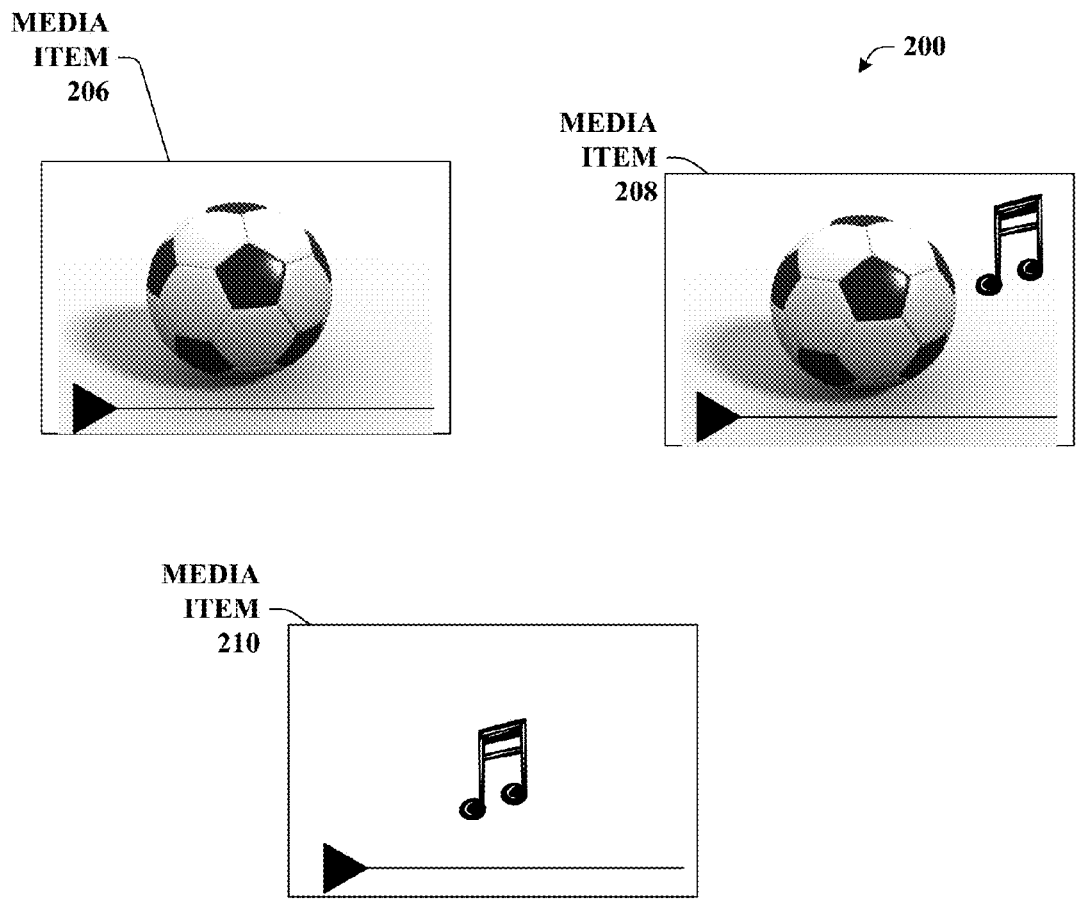
FIG. 2 illustrates a diagram of media items that can be classified in accordance with certain embodiments of this disclosure.

Turing to FIG. 2, with reference to FIG. 1, there depicted is an illustrative example system 200 of a media items that can be classified by system 100 and/or other systems and methods described herein. As an example, the detection component 110 can determine a cluster associated with media item 206. A cluster can comprise a set of media items (and/or representations of media items) that have a common and/or related set of descriptors describing an aspect of a media item. It is noted that media items can be associated with one or more clusters. For example, a media item can be associated with a first cluster associated with an audio channel, a second cluster associated with a video channel, and a third cluster associated with both audio and video channels. It is further noted that media items belonging to one cluster can be identical, near identical, and/or disparate in such a way that they do not share any other clusters. As an example, media item 206 of a soccer match can belong to a first cluster for audio, a second cluster for video, and a third cluster for both audio and video. Media item 208 of the same and/or similar soccer match can be identical on the video channel but can be set to music. Thus, media item 208 can belong to the same video cluster as the media item 206, but can belong to different clusters for its audio channel and combination (both audio and video) channel. Continuing with the example, media item 210 may contain similar and/or identical music as media item 208. Thus, media item 210 can belong to the same audio cluster as media item 208 but may not belong to any video or combination cluster. It is noted that media item 210 can belong to video or combination clusters associated with media items having no and/or blank video. While clusters are described as along audio, video, and/or both channels, it is noted that a cluster can be associated with other channels as well, such as luminance channels, motion channels, pitch channels, frequency channels, and the like. Further, system 100 can utilize various channels and/or clusters.

In implementations, the detection component 110 can determine changes and/or types of changes associated with descriptive data. In an aspect, the types of changes can include cluster changes, classification changes, and the like. It is noted that the detection component 110 can determine whether the type of change and whether a particular change is exclusive or inclusive. As used herein, exclusive descriptive data comprise data that can change independent of a particular media item, cluster, and/or a particular channel (e.g., audio, video, etc.). Inclusive descriptive data can comprise data that can affect descriptive data of other media items, clusters, and/or particular channels (e.g., audio, video, etc.). In another aspect, descriptive data can be inclusive along a certain channel and exclusive along other channels. It is noted that the detection component 110 can detect changes across multiple classification systems. For example, the detection component 110 can detect changes in loosely related classification systems (e.g., cluster classification and meta-data classifications), tightly coupled classification systems, and the like.

For example, media items 206, 208, and 210 can have respective descriptions. The descriptions can comprise meta-data, tags, and other data that describes an aspect of the content. Media item 206 can have a rating indicating it is appropriate for all ages and media item 208 can have rating indicating it is not appropriate for all ages if the music has profane language. If media item 208 has associated descriptive data describing the media items as "rock music" then media item 210 may be described as associated with "rock music".

The policy component 120 can determine matching media items and determine whether to alter descriptive data of matching media items. In an aspect, a matching media item can comprise a media item that shares a cluster with a media item associated with a change event. For example, if descriptive data of media item 206 changes, the policy component 120 can determine that media item 208 matches based on a cluster associated with both media item 206 and media item 208. In another aspect, the policy component 120 can determine a matching media item based on comparison of media items and/or representations of media items. For example, the policy component 120 can analyze media item 206 and/or a representation of media item 206 such as a set of compact descriptors associated with media item 206. A compact descriptor can represent a fingerprint and/or set of sub-fingerprints of media item 206, a digest of media item 206, an index of media item 206, and the like. Policy component 120 can determine media items that match media item 206 based on an analysis of media items. For example, the policy component 120 can analyze a set of media items and determine media item 208 matches media item 206.

In implementations, the policy component 120 can determine matched media items based a determined channel of media items. In an aspect, the policy component 120 can select a channel for matching based on analysis of a change and/or an alteration policy. The analysis of the change can include determining a type of change, a field associated with a change, and the like. The alteration policy can include instructions that indicate preferred and/or determined actions to make in response to analyzing the change. For example, the policy component 120 can determine whether to alter descriptive data of media item 208 in response to the detection component 110 detecting a change to descriptive data of media item 206. As another example, a user can provide input to change a description of media item 206 by adding a tag describing the data a soccer match occurred (e.g., "Jan. 1, 2000"). The policy component 120 can determine that the tag relates to the video content of media item 206 and can identify media item 208 as matching the video channel of media item 206. In another example, the policy component 120 can receive, from the detection component 110, an indication that a change of a classification of media item 208 occurred. If the classification is changed from "rock music" to "pop music", the policy component can determine the change is associated with an audio channel of media item 208. The policy component 120 can determine matched media items along the audio channel of media item 208, such as matching media item 210 (e.g., through an audio cluster). It is noted that media item 206 is not matched to media item 208 along the audio channel and the policy component 120 can determine that a change is applicable to media item 210 but not media item 206.

In another aspect, the policy component 120 can determine that an inconsistency and/or alterations should not be corrected based on an alteration policy. For example, a user may desire that their media item has a certain classification regardless of classifications of other media items. As an example, a user can upload media item 206 and describe it as associated with a great performance by a soccer player. A different user associated with media item 208 can describe media item 208 as containing a poor performance of the same soccer player. In this example, either user can flag their description to indicate that their description should not be altered.

In another example, the policy component 120 can resolve discrepancies detected by the detection component 110 based on a policy. As an example, the detection component can determine that media item 206 belongs to a video cluster that is associated with multiple videos. A classification of the videos belonging to the cluster can have discrepancies, for example, media item 206 can be classified as "soccer" while other media items belonging to the cluster can be classified as "rugby". The policy component 120 can determine a confidence score associated with the classifications and select the classifications with the highest confidence score. For example, the policy component 120 can determined that the classification of "soccer" has a higher confidence level than the classification of "rugby" and can select "soccer" as the classification of media items in the cluster. In another aspect, the policy component 120 can determine that both classifications should be applied to both media items. For example, if the confidence scores associated with media item 206 and media item 208 are equal, the policy component 120 can determine to alter descriptive data of both media item 206 and media item 208.

In implementations, a confidence score can represent a probability that determined descriptive data is correct. It is noted that the computation of a confidence score can depend on the descriptive data being scored. In an aspect, a probability that the correct based on a confidence algorithm and/or based on analysis of media items, user input, analysis of other descriptive data fields, and the like. It is noted that a user can provide input to override a determined confidence score.

The merging component 130 can determine whether to change descriptive data of media items. In an aspect, the merging component 130 can receive an instruction from the policy component 120 that indicates descriptive data should be altered in response to the detection component 110 detecting a change. As an example, the merging component 130 can determine whether descriptive data should be changed based on a confidence score, user input, and the like. In implementations, the merging component 130 can alter descriptive data associated with one or more media items. As an example, the merging component 130 can determine that descriptive data of media item 208 should be changed based on a change to descriptive data of media item 206. The merging component 130 can change the descriptive data of media item 208 and/or other media items associated with media item 206. It is noted that the descriptive data can include a change in classification, cluster, and the like.

Figure 3:
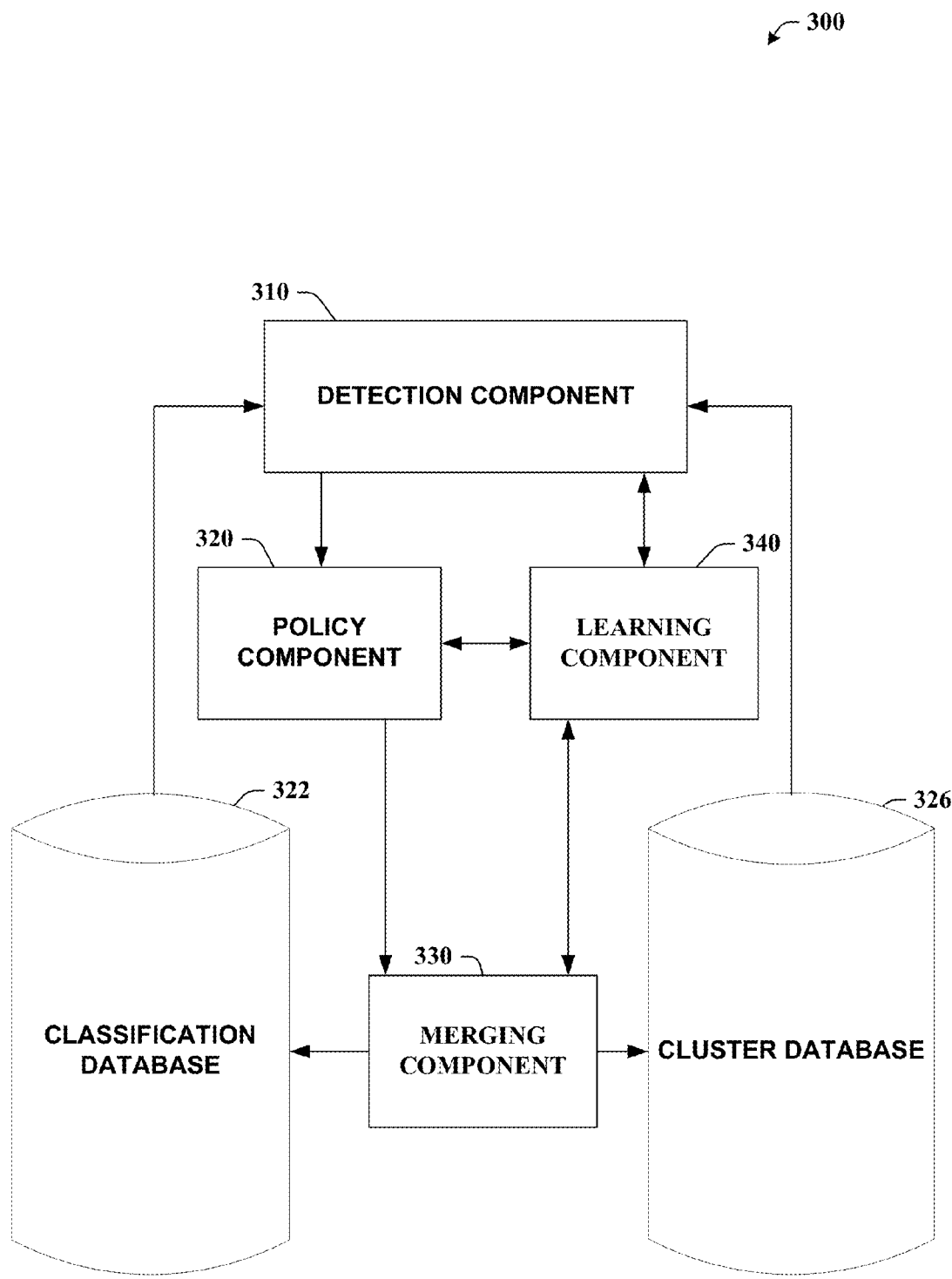
FIG. 3 illustrates a high-level block diagram of an example system that can detect changes in descriptive data and can alter descriptive data of media items and manage classification databases in accordance with certain embodiments of this disclosure.

Turning now to FIG. 3, a system 300 is depicted. System 300 can detect changes in descriptive data and can alter descriptive data of media items and manage classification databases. Embodiments disclosed herein, for example, can detect related media items (and/or channels of media items) in real-time, near real time, and/or in batch processing and alter descriptive data such as clusters, classifiers, meta-data, and the like. System 300 can include a memory that stores computer executable components and a processor that executes computer executable components stored in the memory. System 300 can also include a classification database 322 (which stores classification data of media items) and a cluster database 326 (which can store clusters). While system 300 is described as including classification database 322 and cluster database 326, it is noted that system 300 can include other databases, alternative classification databases, and/or a single database. It is further noted, while classification database 322 and cluster database 326 are depicted as separate entities, that classification database 322 and cluster database 326 can be a single entity.

As depicted, system 300 can include communicably coupled components including a detection component 310 (which can detect changes and/or discrepancies of descriptive data), a policy component 320 (which can identify related media items), a merging component 330 (which can alter descriptive data of media items), and a learning component 340 (which can determine alteration policies). It is noted that digest component 310, indexing component 320, and lookup component 330 can respectively functional similarly or to detection component 110, policy component 120, and merging component 130. It is to be appreciated that the system 300 can include various components described with reference to other systems described herein (e.g., system 100, system 200, etc.).

In implementations, the classification database 322 can comprise classification fields related to media items. It is noted that the classification database 322 can comprise media items and/or references to media items that are stored in a disparate database (such as a media item database). It is noted that media items can have any number of associated classifications (e.g., 0, 1, 2, . . . , N). The classifications can be utilized to describe an aspect of the media item such as upload time, creator, publishing date, subject area, quality indicators, and the like.

The cluster database 326 can comprise clusters associated with media items. It is noted that the clusters can comprise a cluster identifier ("cluster ID"), a set of media items belong to a cluster, references to media items belonging to clusters, and the like. It is further noted that a media item can be associated with one or more clusters, such as an audio cluster, a video cluster, and/or a combination cluster. In an aspect, a media item can be associated with one cluster per channel and/or multiple clusters per channel.

The detection component 310 can detect changes in the classification database 322, changes in the cluster database 326, and/or discrepancies in the classification database 322 and/or the cluster database 326. As an example, a cluster "L" can be associated with media items (e.g., on a channel) $V_i$, $V_j$, and $V_k$, that is L={$V_i$, $V_j$, $V_k$}. Each video of L can be associated with classification data represented as c. For example, $V_j$ can be associated with $c_x$ and $c_y$, $V_k$ can be associated with classification $c_z$, and $V_i$ can be associated with no classifications. Classifications $c_x$, $c_y$, and $c_z$ can represent any classification field.

In response to the detection component 310 detecting a classification change associated with a media item, such as $V_i$, the cluster associated with the media item can be evaluated. Continuing with the above example, if a classification of $V_i$ is detected, then other media items of cluster L ($V_j$, and $V_k$) can be evaluated for consistency. It is noted that certain classifications can be independent of certain match types: for example, if $c_z$ says that $V_j$ contains music by Mozart, a match on the video channel will be irrelevant to this classification. Similarly, a classification of a video as not suitable for children due to harsh language is also independent of the video channel: moreover, harsh language in the metadata is independent of both audio and video. A classification saying that a video contains, e.g., tennis could be regarded as independent of the audio channel, as audio only tennis can be determined to be not tennis, and video only tennis can be determined to be tennis.

In implementations, the policy component 320 can determine media items related to the change event. For example, assume that cx, cy, and cz all are dependent on a video channel, and the change event was with regards to the video channel. The policy component 320 can determine that any change associated with a video channels may create an inconsistency with regards to all videos in cluster L. In response to identifying an inconsistency, the policy component 320 can determine a responsive action, such as report the inconsistency, alter descriptive data to correct the inconsistency, and the like. The policy component 320 has the benefit of having access to all media items in a cluster and their classifications, so it can make decisions at a higher level than what would be possible from a mere inconsistency between two media items.

In implementations, the policy component 320 can determine an action based on the classification associated with a change event. For example, for an exclusive classification the policy component can determine to apply the majority classification to all media items in a cluster, apply a classification having the highest confidence score, apply the most/least recently altered classification, and the like. It is noted that the policy component 320 can request manual input and select a classification based on received input. For example, in a cluster of four videos, where two videos are classifies as Rugby and two as American football, assuming that the confidence in both Rugby classifications is higher than the confidence in both American football classifications, it is likely that all four videos are Rugby and the policy component 320 can select Rugby for all the media items.

The merging component 330 can determine if descriptive data should be change in the classification database 322 and/or the cluster database 326. In an aspect, the merging component 330 can alter classifications and clusters for one or more media items. In another aspect, the merging component 330 can determine not to alter descriptive data based on instructions received from the policy component 320, for example.

The learning component 340 can determine alteration policies and/or confidence scores based on a history of changes, actions, user input, and the like. The alteration policies can be utilized, for example, by the policy component 320 when determining an action. In an aspect, the learning component 340 can store actions taken, types associated with actions, channels associated with actions, classification fields associated with actions, user input, and the like.

The learning component 340 can utilize an artificial intelligence model that can facilitate inferring and/or determining when, where, how alter descriptive data. As used herein, the term "inference" refers generally to the process of reasoning about or inferring states of the system, environment, and/or user from a set of observations as captured via events and/or data. Inference can identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The learning component 340 can employ any of a variety of suitable artificial intelligence (AI)-based schemes as described supra in connection with facilitating various aspects of the herein described invention. For example, a process for learning explicitly or implicitly how parameters are to be created for altering descriptive data according to inconsistencies in a channel based on change events can be facilitated via an automatic classification system and process. Inferring and/or learning can employ a probabilistic and/or statistical-based analysis to infer an action that is to be executed. For example, a support vector machine (SVM) classifier can be employed. Other learning approaches include Bayesian networks, decision trees, and probabilistic classification models providing different patterns of independence can be employed. Learning as used herein also is inclusive of statistical regression that is utilized to develop models of priority.

As will be readily appreciated from the subject specification, the subject innovation can employ learning classifiers that are explicitly trained (e.g., via a generic training data) as well as implicitly trained (e.g., via observing user behavior, receiving extrinsic information) so that the learning classifier is used to automatically determine according to a predetermined criteria which action to take. For example, SVM's can be configured via a learning or training phase within a learning classifier constructor and feature selection module. A learning classifier is a function that maps an input attribute vector, $x=(x1, x2, x3, x4, xn)$, to a confidence that the input belongs to a learning class—that is, $f(x)$=confidence(class).

Figure 4:
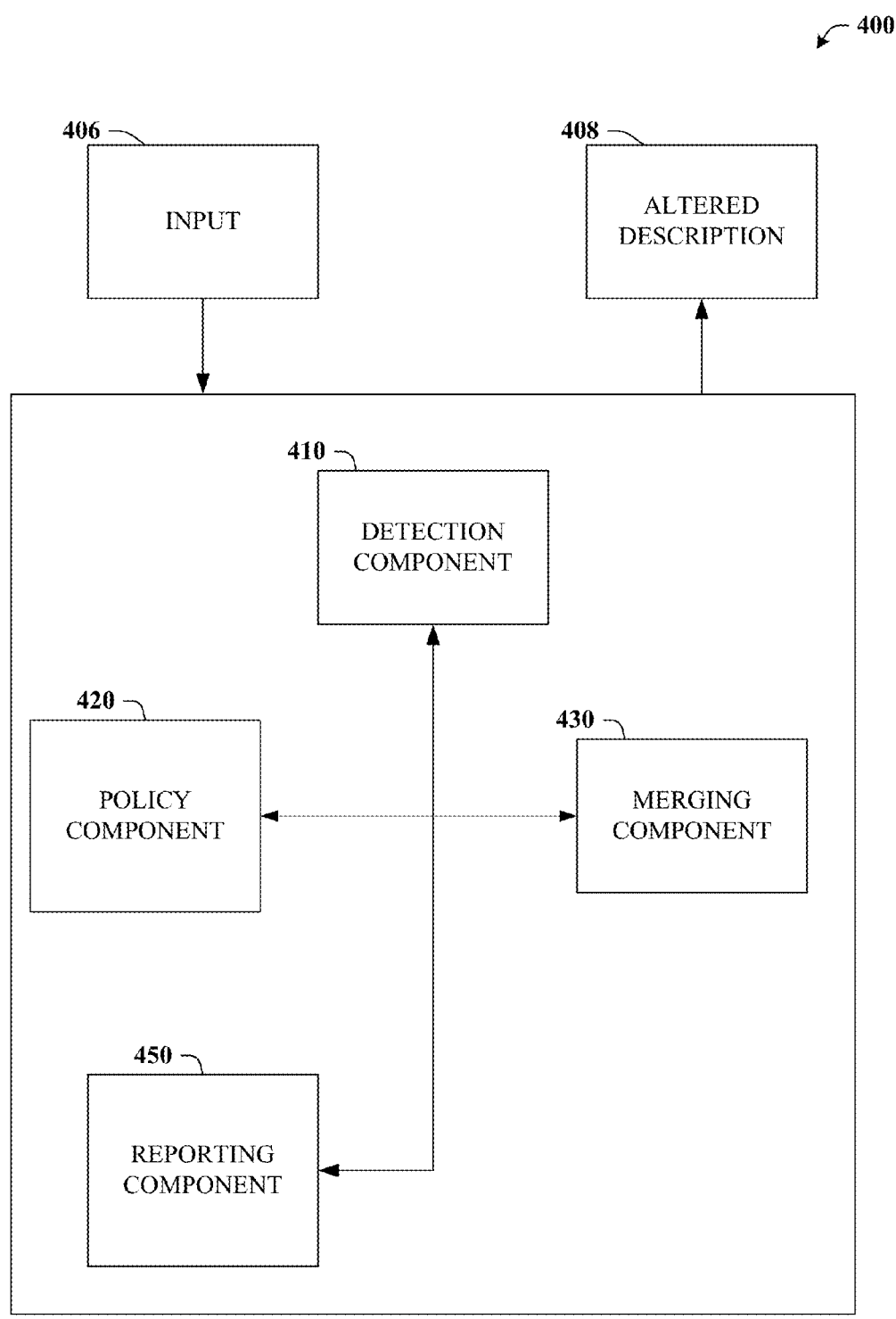
FIG. 4 illustrates a high-level block diagram of an example system that can detect inconsistencies in classification systems including a reporting component, in accordance with certain embodiments of this disclosure.

Referring now to FIG. 4, system 400 is depicted. System 400 can detect inconsistencies in classification systems including reporting detected inconsistencies. System 400 can include all or portions of systems 100-300 as described previously or other systems or components detailed herein. As depicted, system 400 can include communicably coupled components including a detection component 410 (which can detect changes and/or discrepancies of descriptive data), a policy component 420 (which can identify related media items), a merging component 430 (which can alter descriptive data of media items), and a reporting component 450 (which can report inconsistencies associated with descriptive data of media items).

The reporting component 450 can determine whether to generate a message that indicates system 400 is altering descriptive data, is attempting to alter descriptive data, requires user input, and the like. In an aspect, the reporting component 450 can receive an instruction form the policy component 420 that indicates whether to report a change and/or attempted change. In another aspect, the reporting component 450 can monitor changes and/or decisions and generate a report based on the changes and/or decisions. In some implementations, the reporting component 450 can halt and/or delay a change until occurrence of another event. For example, the reporting component 450 can halt a change until input is received, until a passage of time, and the like. In an aspect, the reporting component 450 can alert the merging component 430 when a change is no longer halted.

In implementations, the reporting component 450 can generate a message via one or more methods. For example, the reporting component 450 can generate an email alert, an alert in a computer application (e.g., a browser), a cellular message, and the like. The message can comprise an data describing a desired action, requesting input, notifying of an alterations and the like. It is noted that the reporting component 450 can determine recipients of a message based on user input, original uploaders of media items, users associated with adding classifications, copyright holders of media items, network administrators, and the like. In an aspect, recipients can determined based on a type of alterations and/or an alteration policy (e.g., received from the policy component 420).

Figure 5:
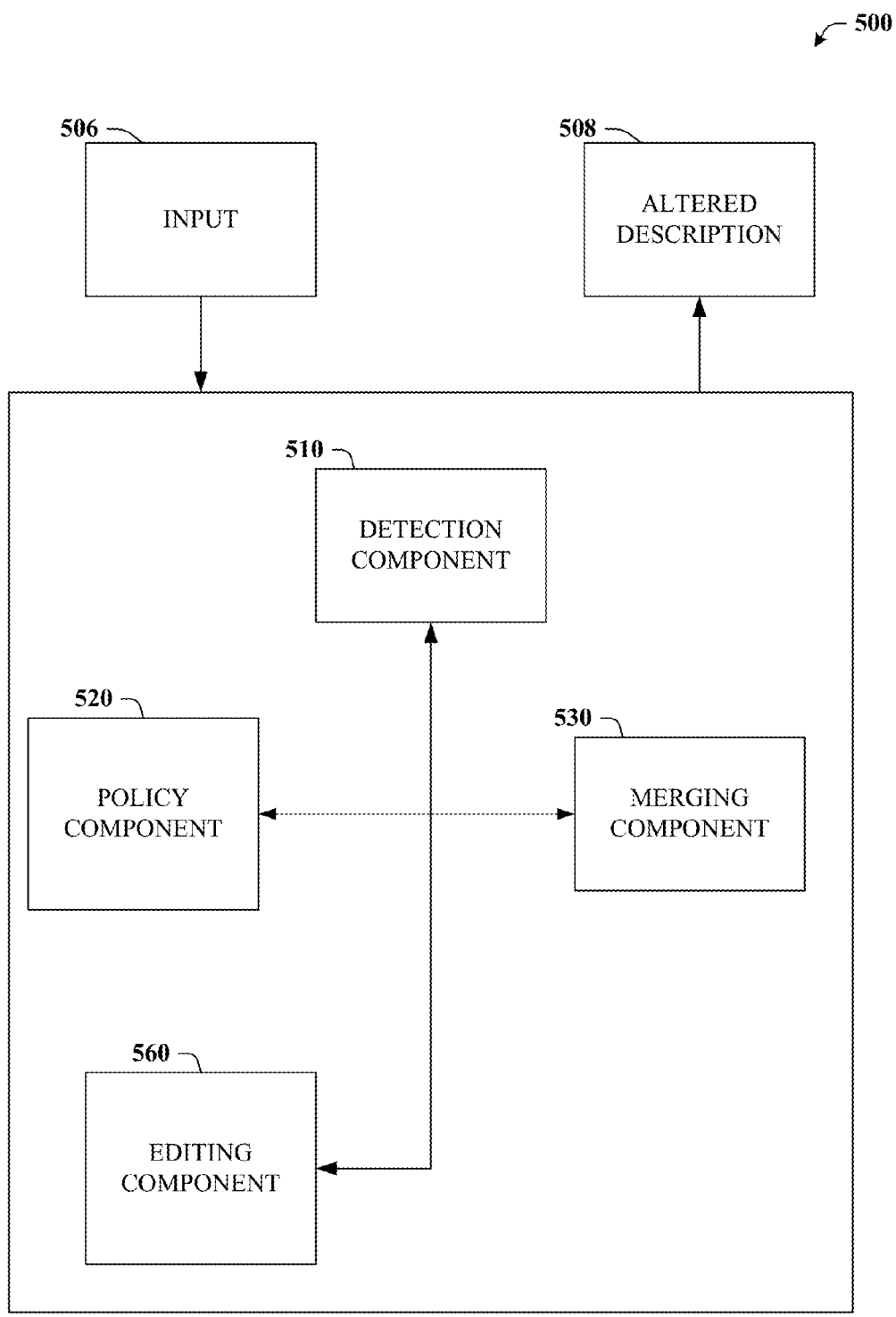
FIG. 5 illustrates a high-level block diagram of an example system that can detect inconsistencies in classification systems including an editing component, in accordance with certain embodiments of this disclosure.

Referring now to FIG. 5, system 500 is depicted. System 500 detects inconsistencies in classification systems including editing data based on user input. System 500 can include all or portions of systems 100-400 as described previously or other systems or components detailed herein. As depicted, system 500 can include communicably coupled components including a detection component 510 (which can detect changes and/or discrepancies of descriptive data), a policy component 520 (which can identify related media items), a merging component 530 (which can alter descriptive data of media items), and an editing component 560 (which can report inconsistencies associated with descriptive data of media items).

Editing component 560 can receive input 506 in the form of user provided input, computer generated input, and the like. In an aspect, editing component 560 can receive input 506 to edit descriptive data associated with media items and/or edit media items. For example, a user may desire a particular video to be removed from consideration, such as a video review of the user's video. In another example, a user can provide input to edit a media item (e.g., audio, video, and/or both) and the editing component 560 can receive the input and alter the media item.

In implementations, the editing component 560 can receive input to alter descriptive data of a media item(s), add data describing the media item(s), and determine whether or not the alteration and/or addition is valid. For example, with reference to FIG. 2, the editing component 560 can receive input from a user request to change a classification of media item 206 to "Basketball". In an aspect, the policy component 520 can determine whether or not the change should occur based on a confidence score of the change and/or the like and the editing component 560 can generate an alert (e.g., error message, warning, and the like) to notify a user that the classification is inconsistent, will not be implement, requires user override, and/or the like.

In another aspect, editing component 560 can receive input identifying a classification as incorrect and/or inconsistent. For example, media items 206 and 208 can be erroneously classified as "basketball" and a user can provide input indicating that the classification is incorrect and should be "soccer". It is noted that the user can provide input indicating one or both of media items 206 and 208 are incorrect. The editing component 560 can verify the user input (e.g., through a confidence score, an administrator, and/or the like). In another aspect, the detection component 510 can detect a verified change processed by the editing component 560.

Figure 6:
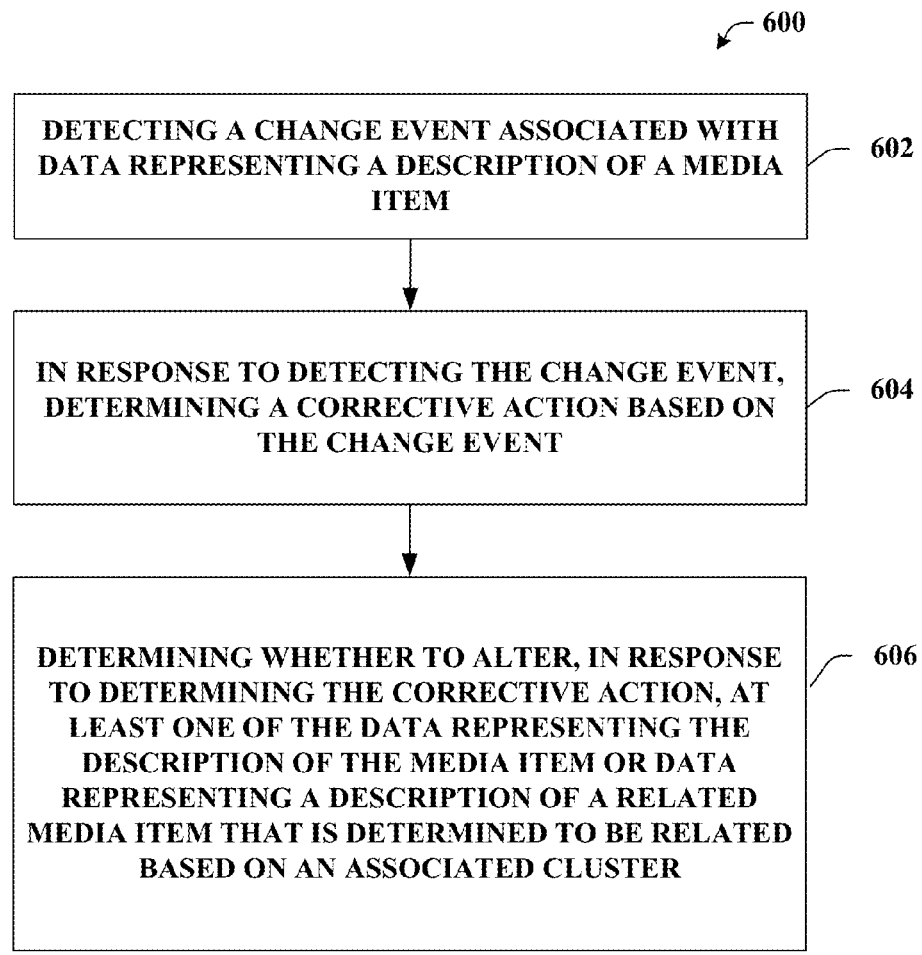
FIG. 6 illustrates an example methodology that can detect change events and can correct inconsistencies in accordance with certain embodiments of this disclosure.
Figure 7:
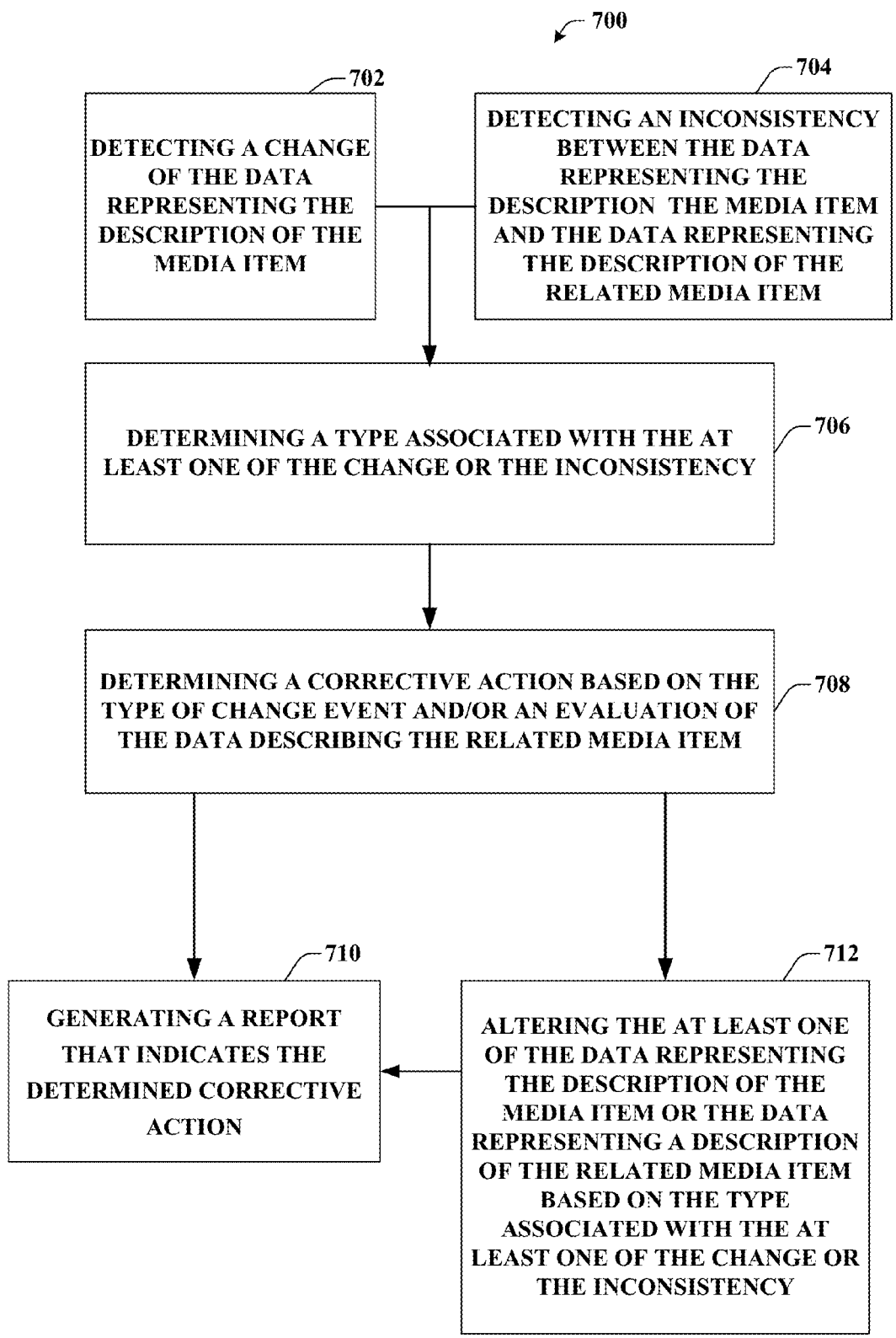
FIG. 7 illustrates an example methodology that can detect change events and can generate a corrective action in accordance with certain embodiments of this disclosure.
Figure 8:
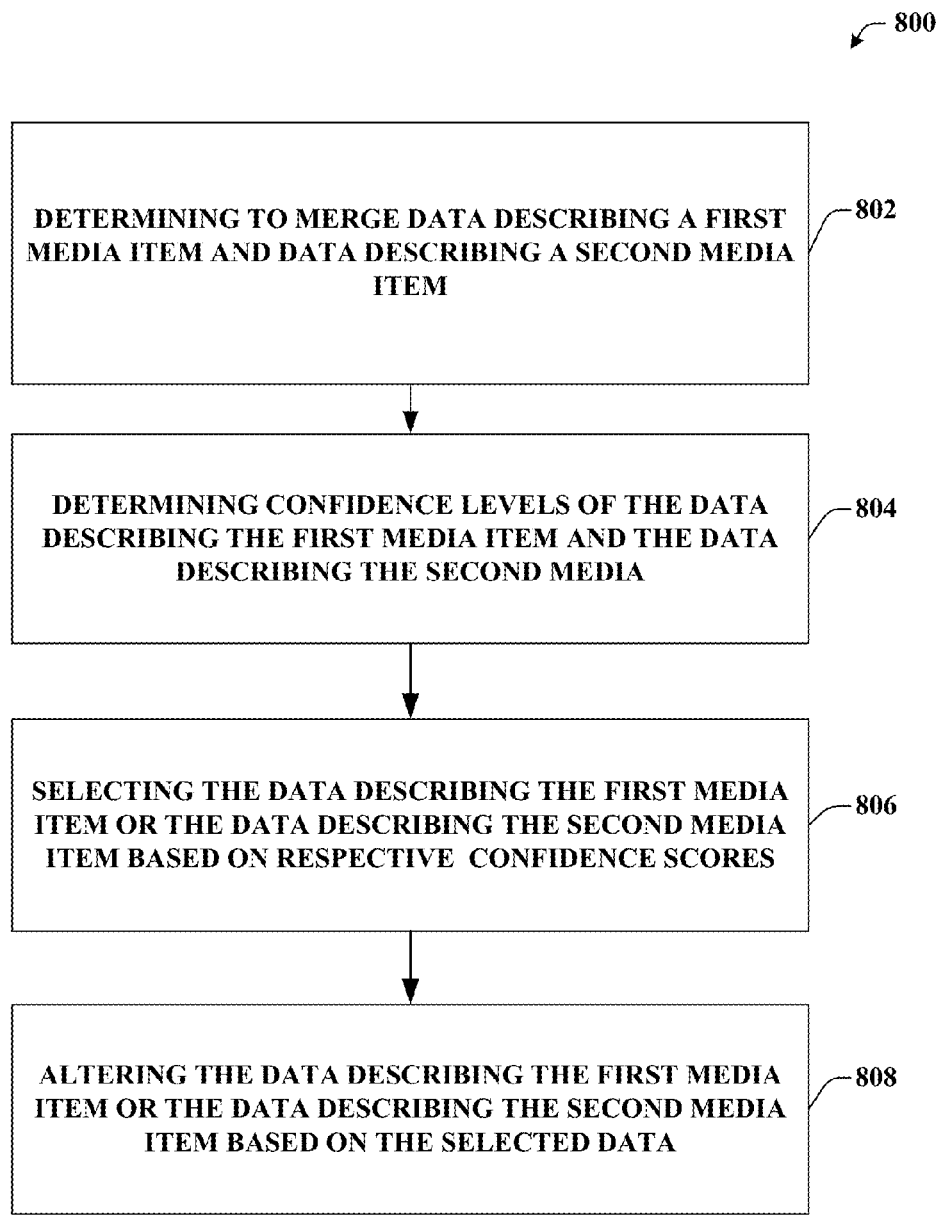
FIG. 8 illustrates an example methodology that can detect change events and can select data for alterations in accordance with certain embodiments of this disclosure.

FIGS. 6-8 illustrate various methodologies in accordance with certain embodiments of this disclosure. While, for purposes of simplicity of explanation, the methodologies are shown media a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media. It is noted that the methods depicted in FIGS. 6-8 can be performed by various systems disclosed herein, such as systems 100, 200, 300, 400 and 500.

FIG. 6 illustrates exemplary method 600. Method 600 can provide for altering descriptive data of media items and classifying media items in a massive media sharing system. In another aspect, the method 600 can detect change events and can determine correction policies in response to the change events.

At reference numeral 602, a system can detect (e.g., via detection component 110) a change event associated with data representing a description of a media item. The change event can represent an event that requires a responsive action. In implementations, the change event can be a change in classifications of a media item, changes in a cluster of a media item, an inconsistency in classifications of media items, and the like. For example, the detection component 110 of FIG. 1 can determine that classification data of a media items is or has been altered. In another example, the detection component 110 can detect an inconsistency between classifications of media items belonging to a common cluster.

At 604, the system can, in response to detecting the change event, determine (e.g., via policy component 120) a corrective action based on the change event. The corrective action can comprise altering descriptive data, generating a report, and the like. For example, the policy component 120 can determine a corrective action based on an alteration policy and/or analysis of other media items and associated descriptive data.

At 606, the system can determine (e.g., via merging component 130) whether to alter, in response determining the corrective action, at least one of the data representing the description of the media item or data representing a description of a related media item that is determined to be related based on an associated cluster. The related media item can be related based on a cluster being associated with both media items. In an aspect, the cluster can pertain to a channel determined to be associated with the change event. For example, a change event can comprise a change to a video classification and the related media item can be related to a video cluster of the media item. In another aspect, the corrective action can be implemented (e.g., via merging component 130) if it is determined that the change should take place. As an example, the merging component 130 can determine that a change is unique to the media item and should not result in altering descriptive data of related media items.

Turning now to FIG. 7, exemplary method 700 is depicted. Method 700 can provide for altering descriptive data of media items and/or generating a report regarding a corrective action. For example, the method 700 can provide for detecting a type of change event and determining an appropriate corrective action (e.g., altering descriptive data and/or generating a report).

At reference numeral 702, a system can detect (e.g., via detection component 310) a change of the data representing the description of the media item. The change of data can represent a change in classification data, cluster, and the like.

At 704, the system can detect (e.g., via detection component 310) an inconsistency between the data representing the description the media item and the data representing the description of the related media item. For example, the inconsistency can be contradicting classification data between two media items having a common cluster. It is noted that the cluster can be related to one or more channels.

At 706, the system can determine (e.g., via the policy component 320) a type associated with the at least one of the change or the inconsistency. The type can comprise an inclusive, exclusive, and/or other type. As an example, the policy component 320 can determine if changed data or inconsistent data is exclusive or inclusive to other media items of a common cluster. In another aspect, the type of change can comprise a classification change event (e.g., classification data is changed for one or more media items of a common cluster) or a cluster change event (e.g., a media item changes an associated cluster).

At 708, the system can determine (e.g., via the policy component 320) a corrective action based on the type of change event and/or an evaluation of the data describing the related media item. For example, the corrective action can be determined based on an alteration policy. It is noted that the alteration policy can be predetermined and/or dynamically determined (e.g., learned).

At 710, the system can generate (e.g., via reporting component 450) a report that indicates the determined corrective action. In implementations, the report can comprise an error message, a message indicating a corrective action requires authorization, and the like. It is noted that the report can be generated as a pop up message, an email, and the like.

At 712, the system can alter (e.g., via merging component 430) at least one of the data representing the description of the media item or the data representing a description of the related media item based on the type associated with the at least one of the change or the inconsistency. For example, a corrective action can indicate whether data should be altered to propagate a change and/or correct inconsistencies of classifications. In implementations, a user can provide input to authorize a change and/or correction. In another aspect, the system can generate a report at 710 indicating that a change has occurred.

Turning now to FIG. 8, example method 800 is illustrated. Method 800 can provide for altering descriptive data of media items based on an alteration policy. For example, the method 800 can provide for selecting data of associated with a media item for other media items associated with a common cluster.

At 802, a system can determine (e.g., via merging component 130) to merge data describing a first media item and data describing a second media item. For example, a system can determine that a change to classification of a first media item should be reflected to a classification of a second media item and/or an inconsistency should be corrected.

At 804, a system can determine (e.g., via merging component 130) confidence levels of the data describing the first media item and the data describing the second media. In an aspect, the confidence levels can be determined based on a classification being consistent in a majority of media items of a cluster, user input, analysis of classifications of other media items, and the like.

At 806, a system can select (e.g., via merging component 130) the data describing the first media item or the data describing the second media item based on respective confidence scores. For example, a system can select descriptive data of a first media item if the descriptive data has a higher confidence level than descriptive data of the second media item.

At 808, a system can alter (e.g., via merging component 130) the data describing the first media item or the data describing the second media item based on the selected data. For example, a system can alter descriptive data of a second media item if the descriptive data to match the descriptive data of a first media item. It is noted that the system can alter a determined data field and/or multiple data fields associated with classifications.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
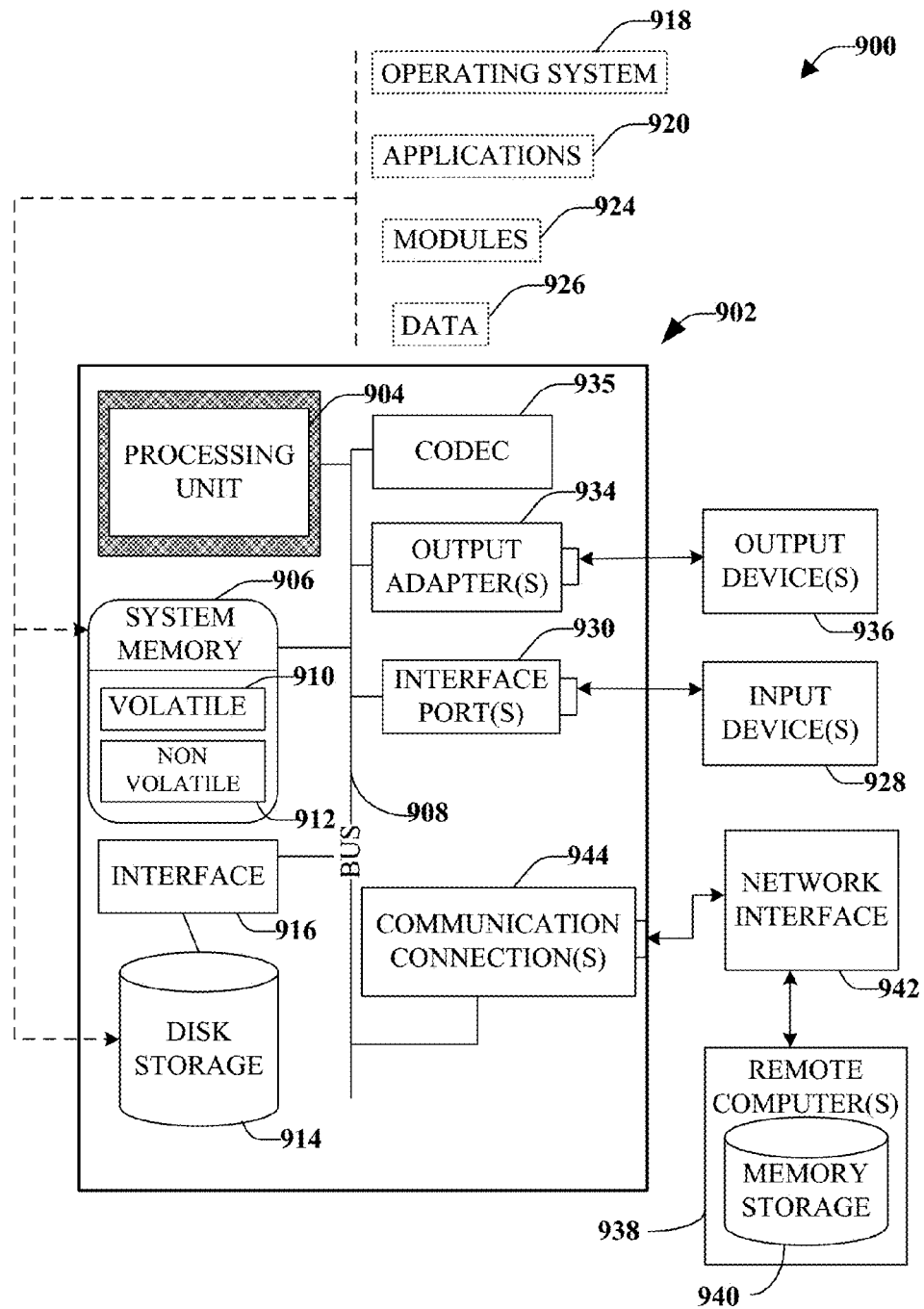
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. For example, in one or more embodiments, all or portions of codec 935 can be included in encoding component 118 and/or decoding component 514. Although, codec 935 is depicted as a separate component, codec 935 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can be provided the opportunity to opt-in or opt-out of having such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/ software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
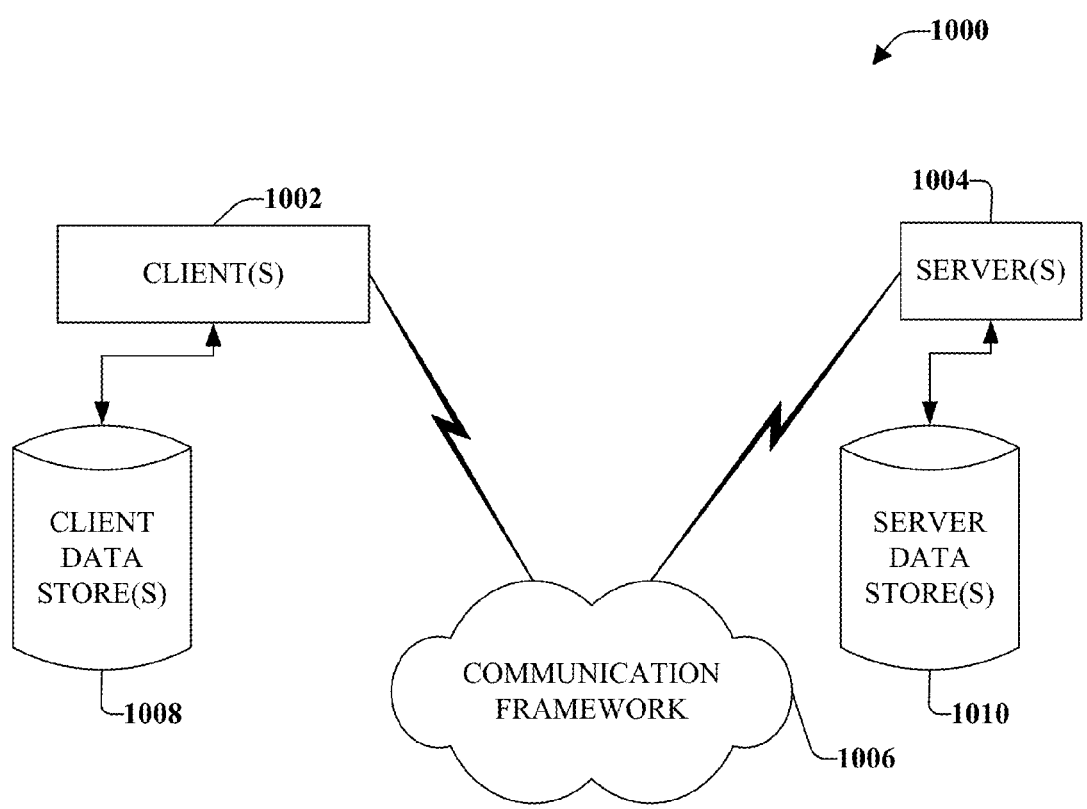
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system, comprising:
   a memory that has stored thereon computer executable components;
   a processor that executes the following computer executable components stored in the memory:
   a detection component that detects a change event associated with a media item of a plurality of media items, the change event associated with data representing a description of the media item, wherein the description of the media item is metadata;
   a policy component that, in response to the detection component detecting the change event, determines a set of media items of the plurality of media items that are related to the change event, determining the set of media items comprising:
   determining a classification of the media item associated with the change event;
   identifying a plurality of media item clusters containing the media item associated with the change event; and
   selecting a cluster of the plurality of media item clusters responsive to the determined classification of the media item associated with the change event, the selected cluster containing a plurality of clustered media items;
   the policy component further determining a corrective action to perform on the plurality of clustered media items based on the change event; and
   a merging component that determines whether to alter, in response to the policy component determining the corrective action, data representing the descriptions of the clustered media items.

2. The system of claim 1, wherein detecting the change event by the detection component comprise at least one of:
   detecting a change of the data representing the description of the media item; or
   detecting an inconsistency between the data representing the description of the media item and the data representing the descriptions of the clustered media items.

3. The system of claim 2, wherein the policy component determines a type associated with the change or the inconsistency.

4. The system of claim 3, wherein the merging component alters the data representing the descriptions of the clustered media items based on the type associated with the change or the inconsistency.

5. The system of claim 3, wherein the type comprises an exclusive type or non-exclusive type.

6. The system of claim 1, wherein the policy component determines the corrective action based on an evaluation of classifications of the clustered media items.

7. The system of claim 6, wherein the policy component determines the corrective action based on a classification determined to apply to a majority of the clustered media items.

8. The system of claim 1, wherein the merging component alters the data representing the descriptions of the clustered media items based on associated confidence scores of the respective data.

9. The system of claim 1, further comprising:
   a reporting component that, in response to the policy component determining the corrective action, generates a report that indicates at least one of the determined corrective action or the change event.

10. A method comprising:
    employing a processor to execute computer executable instructions stored in a memory to perform the following acts:
    detecting a change event associated with a media item of a plurality of media items, the change event associated with data representing a description of the media item, wherein the description of the media item is metadata;
    in response to detecting the change event, determining a set of media items of the plurality of media items that are related to the change event, determining the set of media items comprising:
    determining a classification of the media item associated with the change event;
    identifying a plurality of media item clusters containing the media item associated with the change event; and
    selecting a cluster of the plurality of media item clusters responsive to the determined classification of the media item associated with the change event, the selected cluster containing a plurality of clustered media items; and
    determining, in response to detecting the change event, a corrective action to perform on the plurality of clustered media items based on the change event.

11. The method of claim 10, the acts further comprising:
    determining whether to alter, in response to determining the corrective action, data representing the descriptions of the clustered media items.

12. The method of claim 10, the acts further comprising:
    in response to determining the corrective action, generating a report comprising data describing the corrective action.

13. The method of claim 10, the acts further comprising:
    receiving input regarding the corrective action; and
    determining a new corrective action based on the input.

14. A computer readable storage device comprising instructions that, in response to execution, cause a system comprising a processor to perform operations, comprising:
    detecting a change event associated with a media item of a plurality of media items, the change event associated with data representing a description of the media item, wherein the description of the media item is metadata;
    in response to detecting the change event, determining a set of media items of the plurality of media items that are related to the change event, determining the set of media items comprising:
    determining a classification of the media item associated with the change event;
    identifying a plurality of media item clusters containing the media item associated with the change event; and
    selecting a cluster of the plurality of media item clusters responsive to the determined classification of the media item associated with the change event, the selected cluster containing a plurality of clustered media items; and
    determining, in response to detecting the change event, a corrective action to perform on the plurality of clustered media items based on the change event.

15. The computer readable storage device of claim 14, wherein detecting the change event comprises:
    determining whether the data representing a description of the media item is altered; or determining whether the data representing a description of the media item is inconsistent with data representing a description of a second media item.

16. The computer readable storage device of claim 14 wherein the operations further comprise:
determining the corrective action based on an alteration policy.

17. The computer readable storage device of claim 16, wherein the operations further comprise:
determining the alteration policy based on a history of at least one of corrective actions or user input.

* * * * *